United States Patent [19]
Van Broekhoven et al.

[11] Patent Number: 4,831,113
[45] Date of Patent: May 16, 1989

[54] PROCESS FOR POLYMERIZING CARBON MONOXIDE AND OLEFINS WITH A QUINONE

[75] Inventors: Johannes A. M. Van Broekhoven; Eit Drent, both of Amsterdam, Netherlands

[73] Assignee: Shell Oil Company, Houston, Tex.

[21] Appl. No.: 21,946

[22] Filed: Mar. 5, 1987

[30] Foreign Application Priority Data

Mar. 5, 1986 [NL] Netherlands ............... 8600563

[51] Int. Cl.$^4$ ............................................. C08G 67/02
[52] U.S. Cl. ................................ 528/392; 502/154
[58] Field of Search ............................................. 528/392

[56] References Cited

U.S. PATENT DOCUMENTS

| | | | |
|---|---|---|---|
| 2,495,286 | 1/1950 | Brubaker | 260/63 |
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,780,140 | 12/1973 | Hammer | 525/185 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,070,532 | 1/1978 | Hammer | 526/11.2 |
| 4,076,911 | 2/1978 | Fenton | 526/11.1 |
| 4,414,409 | 11/1983 | Waller | 560/233 |
| 4,424,317 | 1/1984 | Serres | 525/539 |
| 4,474,978 | 10/1984 | Drent | 560/24 |
| 4,599,476 | 7/1986 | Drent | 585/511 |
| 4,600,614 | 7/1986 | Lancaster et al. | 428/35 |
| 4,634,793 | 1/1987 | Drent | 560/243 |

FOREIGN PATENT DOCUMENTS

| | | |
|---|---|---|
| 121965 | 8/1984 | European Pat. Off. . |
| 181014 | 5/1986 | European Pat. Off. . |
| 2046968 | 10/1964 | Japan . |
| 7-4048406 | 3/1969 | Japan . |
| 1081304 | 3/1965 | United Kingdom . |
| 2058074 | 8/1979 | United Kingdom . |

OTHER PUBLICATIONS

Kirk-Othmer Encyclopedia of Chemical Technology, Second Edition, vol. 12, p. 132, 1967.
Encyclopedia of Polymer Science and Technology, 1968, vol. 9, 397–402.
J. Am. Chem. Soc., 1982, 104, 3520-2.
Tetrahedron Lett., 1971, 26, 2409–2412.
Organometallics, 1984, 3, 866–870.
Proc. Ind. Assoc. Cult. Sci., 1985, 68B, 1-5.
Chemtech, 1986, 1, 48–51.
Adv. Polym. Sci., 1986, 73-4, 125–44.
J. Organomet. Chem., 1985, 279, C5–C10.
Polym. Lett., 1965, 3, 703–7.
Chim. Ind., 1971, 53, 939–40.
J. Mol. Catal., 1983, 18, 117–25.

*Primary Examiner*—Harold D. Anderson

[57] ABSTRACT

The invention relates to compositions that may be used as catalysts for the preparation of polymers of carbon monoxide and at least one olefinically unsaturated organic compound. The invention also relates to a process using the catalyst compositions of the invention to prepare said polymers. The process comprises contacting the monomers in the presence of a catalyst obtained from the reaction of (a) a Group VIII metal compound with (b) a bidentate phosphorus, arsenic or antimony ligand, (c) a non-hydrohalogenic acid with a pKa less than 6, and (d) a quinone.

44 Claims, No Drawings

PROCESS FOR POLYMERIZING CARBON MONOXIDE AND OLEFINS WITH A QUINONE

FIELD OF THE INVENTION

The invention relates to a process for the preparation of polymers of carbon monoxide and at least one alkenically unsaturated organic compound. The invention also relates to the catalyst compositions used in the process of the invention to prepare said polymers.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397-402. It is known that polyketones may be prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possible other olefinically unsaturated hydrocarbons in which all monomer units occur distributed at random within the polymer can be prepared with the aid of radical catalysts such as peroxides. A special class of the polymers of carbon monoxide with ethylene is formed by the high molecular weight linear polymers in which the monomer units occur in alternating order and which polymers consist of units with the formula $-CO-(C_2H_4)-$. Such polymers can be prepared with the aid of, among others, phosphorus-, arsenic-, antimony-, or cyanogen-containing compounds of pallaidum, cobalt or nickel as catalysts.

High molecular weight linear alternating polymers of carbon monoxide and ethylene consisting of units of the formula $-CO-(C_2H_4)-$, can also be prepared by using catalyst compositions comprising:
(a) a compound of a Group VIII metal selected from the group consisting of palladium, cobalt and nickel,
(b) a non-hydrohalogenic acid having a pKa less than 6, and
(c) a bidentate ligand of the general formula

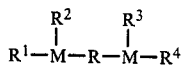

wherein M represents phosphorus, arsenic or antimony, R is a bivalent organic bridging group containing at least two carbon atoms in the bridge and $R^1$, $R^2$, $R^3$ and $R^4$ represent hydrocarbon groups.

Application of these catalyst compositions to a monomer mixture which, in addition to carbon monoxide, comprises for example ethylene and one or more alkenically unsaturated hydrocarbons having the general formula $C_xH_y$ leads to the formation of polymers with units of the formula $-CO-(C_2H_4)-$ and units of the general formula $-CO-(C_xH_y)-$ occurring randomly distributed throughout the polymer chains. The structures of the copolymers and 'terpolymers' only differ in that in the case of the 'terpolymers' a group $-(C_xH_y)-$ is encountered at random places in the polymer instead of a $-(C_2H_4)-$group.

In the above-mentioned polymer preparation both the reaction rates and the molecular weights of the polymers obtained play a major role. On the one hand it is desirable to aim at the highest possible reaction rate in the polymer preparation, on the other hand,—with a view to their potential applicability—these polymers are more valuable with higher molecular weight. Both the reaction rate and the molecular weight can be affected by the temperature used during the polymerization process. Unfortunately, the effect the temperature has on the reaction rate is opposite to its effect on the molecular weight in that at otherwise similar reaction conditions an increase in the reaction temperature results in an increase in reaction rate, but a decrease in molecular weight of the polymers obtained. Considering the applications envisaged for these polymer this relationship will in practice resolve itself into a choice of reaction temperature which leads to polymers having molecular weights that are high enough for the relevant application and the reaction rate that goes with this temperature being a part of the bargain.

SUMMARY OF THE INVENTION

It has now been found that the activity of these catalysts for the polymerization of carbon monoxide with one or more olefinically unsaturated organic compounds can be considerably enhanced by incorporating a quinone into the compositions.

The patent application therefore relates to a process for the preparation of polymers of carbon monoxide with at least one alkenically unsaturated organic compound which process comprises contacting carbon monoxide and at least one alkenically unsaturated organic compound in the presence of a catalyst obtained by reacting (1) a compound of a Group VIII Metal selected from the group consisting of palladium, cobalt and nickel, (2) a non-hydrohalogenic acid with a pKa less than 6, (3), a bidentate ligand of the general formula

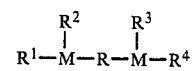

wherein M is selected from the group consisting of phoshporus, arsenic or antimony, R is a bivalent organic bridging group containing at least two carbon atoms in the bridge, $R^1$, $R^2$, $R^3$ and $R^4$ are substituted or non-substituted hydrocarbon groups, and (4) a quinone, and under conditions suitable to prepare a linear alternating polymer.

The patent application further relates to catalyst compositions comprising:
(a) a compound of a Group VIII metal selected from the group consisting of palladium, cobalt and nickel,
(b) a non-hydrohalogenic acid having a pKa less than 6,
(c) a bidentate liquid of the general formula

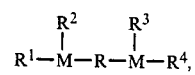

wherein M is selected from the group consisting of phosphorus, arsenic or antimony, R represents a bivalent organic bridging group having at least two carbon atoms in the bridge, $R^1$, $R^2$, $R^3$ and $R^4$ represent substituted or non-substituted hydrocarbon groups, and (d) a quinone.

The patent application further relates to the polymers of carbon monoxide with at least one olefinically unsaturaed organic compound thus prepared and to shaped objects which consist at least partly of these polymers.

DETAILED DESCRIPTION OF THE INVENTION

The preferred Group VIII metal compound present in the catalyst composition is a palladium compound. Very suitable are palladium salts of carboxylic acids and in particular palladium acetate. Examples of suitable acids with a pKa less than 6 (determined in aqueous solution at 18° C.) are sulfonic acid, perchloric acid, sulfonic acids, such as methanesulfonic acid, trifluoromethanesulfonic acid and para-toluenesulfonic acid and carboxylic acids, such as trichloroacetic acid, difluoroacetic acid, and trifluoroacetic acid. Preferred are all acids with a pKa less than 4, acids with a pKa less than 2 are even more preferred. The most preference is given to paratoluenesulfonic acid and trifluoroacetic acid. The preferred quantity of the nonhydrohalogenic acid with a pKa less than 6 present in the catalyst compositions is from 0.5 to 200, and more preferred from 1.0 to 100, equivalents per gram atom of Group VIII metal.

In the bidentate ligand M is preferably phosphorus. The preferred quantity of bidentate ligand present in the catalyst composition is from 0.1–5 and more preferred from 0.5–1.5 mol per mol of Group VIII metal compound. The groups $R^1$, $R^2$, $R^3$ and $R^4$ present in the bidentate ligand each preferably contain 6 to 14 carbon atoms. Especially preferred are bidentate ligands in which each one of the groups $R^1$, $R^2$, $R^3$ and $R^4$ contains an aryl group which is directly linked to the M atom. Even more preferred are phenyl groups and alkyl-substituted phenyl groups. $R^1$, $R^2$, $R^3$ and $R^4$ may also be substituted with polar groups. The bivalent organic bridging group R preferably contains three carbon atoms in the bridge. Examples of suitable bidentate ligands are:

1,3-bis(di-p-tolylphosphino)propane,
1,3-bis(di-p-methoxyphenylphosphino)propane,
1,3-bis(diphenylphosphino)propane, and
2-methyl-2-(methyldiphenylphosphine)-1,3-bis(-diphenyl-phosphino)propane.

Preferably either one of the latter two bidentate ligands is used.

As the component (d) either 1,2- or 1,4-quinones may be used. Preference is given to 1,4-quinones. Besides substituted or unsubstituted benzoquinones, other quinones, such as substituted or unsubstituted naphthaquinones and anthraquinones, are also eligible. Preference is given to benzoquinones and to 1,4-benzoquinones in particular. Examples of suitable compounds of this type are:

2,6-dichloro-1,4-benzoquinone,
tetrachloro-1,4-benzoquinone,
2,3-dimethyl-1,4-benzoquinone,
2,6-dimethyl-1,4-benzoquinone,
mono-methyl-1,4-benzoquinone,
trichloro-1,4-benzoquinone,
2,5-dihydroxy-1,4-benzoquinone,
2,5-dihydroxy-3,6-dinitro-1,4-benzoquinone, and
mono-nitro-1,4-benzoquinone.

The preferred component (d) is 1,4-benzoquinone. The preferred quantity used in 1–10000 and in particular 10–5000 mol per gram atom of palladium.

The polymerization using the catalyst compositions according to the invention is preferably carried out in a liquid diluent. Very suitable liquid diluents are lower alchols such as methanol and ethanol.

Eligible olefinically unsaturated organic compounds that can be polymerized with carbon monoxide with the aid of the catalyst compositions according to the invention are both compounds which consist exclusively of carbon and hydrogen and compounds which, in addition to carbon and hydrogen, contain one or more hetero-atoms. Be preference the catalyst compositions according to the invention are used to prepare polymers of carbon monoxide with one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes, such as p-methyl styrene and p-ethyl styrene. The catalyst compositions according to the invention are especially suitable for use in the preparation of compolymers of carbon monoxide with ethylene and in the preparation of terpolymers of carbon monoxide with ethylene and with an other olenfinically unsaturated hydrocarbon, in particular propylene.

The quantity of catalyst composition applied in the preparation of the polymers may vary within wide ranges. Per mol of olefinically unsaturated compound to be polymerized, a quantity of catalyst is used which preferably contains $10^{-7}$-$10^{-3}$ and in particular $10^{-6}$-$10^4$ of gram atom of palladium.

Preferably, the preparation of the polymers is carried out at a temperature of 20°–200° C. and a pressure of 1–200 bar and in particular at a temperature of 30°–150° C. and a pressure of 20–100 bar. In the mixture to be polymerized the molar ratio of the olefinically unsaturated organic compounds relative to carbon monoxide preferably is 10:1–1:5 and in particular 5:1–1:2. THe carbon monoxide used in the preparation of the polymers according to the invention need not be pure. It may contain contaminations, such as hydrogen, carbon dioxide and nitrogen.

The polymers according to the invention have good mechanical properties. They can be processed by means of the usual techniques into, among other things, films, sheets, plates, fibers and molded objects. The low molecular weight polymers in particular may be used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following examples.

EXAMPLE 1

A carbon monoxide/ethylene copolymer was prepared as follows. A magnetically stirred autoclave of 300 ml capacity was charged with 200 ml of methanol. After the contents of the autoclave were brought to 65° C., a 1:1 carbon monoxide/ethylene mixture was introduced until a pressure of 55 bar was reached. Then the autoclave was charged with a catalyst solution consisting of:
- 18 ml methanol,
- 0.03 mmol of palladium acetate,
- 0.036 mmol of 1,3-bis(diphenylphosphino)propane, and
- 0.06 mmol of p-toluenesulfonic acid.

The pressure was maintained at 55 bar by introducing under pressure a 1:1 carbon monoxide/ethylene mixture. After 1.5 hour the polymerization was terminated by releasing the pressure. The polymer was filtered off, washed with methanol and dried at 70° C. The yield was 15 g of copolymer, so the polymerization rate was 2500 g of copolymer/g of palladium/hour.

EXAMPLE 2

A carbon monoxide/ethylene copolymer was prepared in substantially the same manner as the copolymer in Example 1, except that now the catalyst solution also contained 0.3 mmol 1,4-benzoquinone. The yield was 22 g of copolymer, so the polymerization rate was 3600 g of copolymer/g of palladium/hour.

EXAMPLE 3

A carbon monoxide/ethylene copolymer was prepared in substantially the same manner as the copolymer in Example 1, the differences being that
(a) a catalyst solution was used comprising:
- 6 ml of methanol,
- 0.01 mmol of palladium acetate,
- 0.012 mmol of 1,3-bis(diphenylphosphino)propane and
- 0.2 mmol of trifluoroacetic acid, and (b) the polymerization was terminated after 2 hours. The yield was 6 g of copolymer, so the polymerization rate was 3000 g of copolymer/g of palladium/hour.

EXAMPLE 4

A carbon monoxide/ethylene copolymer was prepared in substantially the same manner as the copolymer in Example 3, the difference being that now the catalyst solution also contained 1 mmol of 1,4-benzoquinone. The yield was 12 g of copolymer, so the polymerization rate was 6000 g of copolymer/g of palladium/hour.

EXAMPLE 5

A carbon monoxide/ethylene/propylene terpolymer was prepared as follows. A mechanically stirred autoclave of 300 ml capacity was charged with 140 ml of methanol and 86 ml of liquid propylene. After the contents of the autoclave had been brought to a temperature of 65° C., a 1:1 carbon monoxide/ethylene mixture was introduced until a pressure of 55 bar was reached. Then the autoclave was charged with a catalyst solution consisting of:
- 6 ml of methanol,
- 0.01 mmol of palladium acetate,
- 0.012 mmol of 1,3-bis(diphenylphosphino)propane,
- 0.2 mmol of trifluoroacetic acid.

Introduction of a 1:1 carbon monoxide/ethylene mixture kept the pressure at 55 bar. After 4 hours the polymerization was terminated by releasing the pressure. The polymer was filtered off, washed with methanol and dried at 70° C. The yield was 8 g of terpolymer, so the polymerization rate was 2000 g of terpolymer/g of palladium/hour.

EXAMPLE 6

A carbon monoxide/ethylene/propylene terpolymer was prepared in substantially the same manner as the terpolymer in Example 5, except tht now the catalyst solution also contained 1 mmol of 1,4-benzoquinone. The yield was 13 g of terpolymer, so the polymerization rate was 3300 g of terpolymer/g of palladium/hour.

Of the polymers prepared according to Examples 1-6, only the copolymers prepared according to Examples 2 and 4 and the terpolymer prepared according to Example 6 are polymers according to the invention. In the preparation of these polymers use was made of catalyst compositions according to the invention containing a quinone as the fourth component. The copolymers prepared according to Examples 1 and 3 and the terpolymer prepared according to Example 5 fall outside the scope of the invention and have been included in the patent application for comparison.

The favorable effect which the incorporation into the catalyst compositions according to the invention of a quinone as the fourth component has on the polymerization rate becomes evident upon comparison of the results of Example 2,4 and 6 with thoe of the Example 1, 3 and 5, respectively.

All of the copolymers prepared according to Examples 1-4 had melting points of 257° C. The terpolymer prepared according to Example 5 had a melting point of 170° C., and the terpolymer prepared according to Examle 6 had a melting point of 182° C.

With the aid of $^{13}$C-NMR analysis is was established that the carbon monoxide/ethylene copolymers prepared according to Examples 1-4 had a linear alternating structure and therefore consisted of units of the formula $-CO-(C_2H_4)-$.

It was also established by $^{13}$-NMR analysis that the carbon monoxide/ethylene/propylene terpolymers had a linear structure and consisted of units of the formula $-CO-(C_2H_4)-$ and units of the formula $-CO-(C_3H_6)-$, which units occurred randomly distributed within the terpolymers. The data produced by $^{13}$C-NMR analysis showed that in the terpolymer prepared according to Example 5 there were 26 units based on propylene to 74 units based on ethylene, which amounts to a propylene content in the terpolymer of 14.6 %w. Furthermore it was seen that in the terpolymer prepared according to Example 6 there were 215 units based on propylene to 785 units based on ethylene, which amounts to a propylene content in the terpolymer of 12.6 %w.

What is claimed is:

1. A process for preparing a linear alternating polymer which process comprises contacting carbon monoxide and at least one olefinically unsaturated organic compound in the presence of a catalyst wherein the catalyst is obtained by reacting (1) a compound of a Group VIII metal selected from the group consisting of palladium, cobalt and nickel, (2) a non-hydrohalogenic acid with a pKa less than 6, (3) a bidentate ligand of the general alternating polymer.

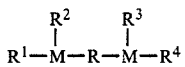

wherein M is selected from the group consisting of phosphorus, arsenic or antimony, R is a bivalent organic bridging group containing at least two carbon atoms in the bridge and $R^1$, $R_2$, $R^3$ and $R^4$ are substituted or unsubstituted hydrocarbon groups, and (4) a quinone, and under conditions suitable for preparing a linear alternting polymer.

2. The process of claim 1 wherein the Group VIII metal compound is a palladium compound.

3. The process of claim 1 wherein the Group VIII Metal compound is a palladium salt of a carboxylic acid.

4. The process of claim 1 wherein the Group VIII metal compound is palladium acetate.

5. The process of claim 1 wherein the non-hydrohalogenic acid having a pKa less than 6 is an acid selected from the group consisting of sulfonic acids having a pKa of less than 2 and carboxylic acids having a pKa of less than 2.

6. The process of claim 1 wherein the non-hydrohalogenic acid having a pKa less than 6 is an acid selected from the group consisting of paratoluenesulfonic acid and trifluoroacetic acid.

7. The process of claim 1 wherein in the reaction to obtain the catalyst, quantity of acid having a pKa less than 6 is from about 0.5 to about 200 equivalents per gram atom of Group VIII metal.

8. The process of claim 1 wherein in the reaction to obtain the catalyst, quantity of acid having a pKa less than 6 is from about 1.0 to about 100 equivalents per gram atom of Group VIII metal.

9. The process of claim 1 wherein M is phosphorus.

10. The process of claim 1 wherein in the reaction to obtain the catalyst, quantity of bidentate ligand is from about 0.1 to about 5.0 mol per mol of Group VIII metal compound.

11. The process of claim 1 wherein in the reaction to obtain the catalyst, quantity of bidentate ligand is from about 0.5 to about 1.5 mol per mol of Group VIII metal compound.

12. The process of claim 1 wherein the divalent organic bridging group R contains three carbon atoms in the bridge.

13. The process of claim 1 wherein the hydrocarbon groups $R^1$, $R^2$, $R^3$, and $R^4$ each contain 6 to 14 carbon atoms.

14. The process of claim 1 wherein the hydrocarbon groups $R^1$, $R^2$, $R^3$, and $R^4$ each contain an aryl group bonded directly to M.

15. The process of claim 1 wherein the hydrocarbon groups $R^1$, $R^2$, $R^3$, and $R^4$ are selected from the group consisting of phenyl groups and alkyl-substituted phenyl groups.

16. The process of claim 1 wherein the bidentate ligand is selected from the group consisting of 1,3-bis(-diphenylphosphino)propane, and 2-methyl-2-(methyldiphenylphosphino)-1,3-bis(diphenylphosphino)propane.

17. The process of claim 1 wherein the process is carried out by contacting the monomers with a catalyst in the presence of a liquid diluting agent.

18. The process of claim 17 wherein the liquid diluting agent is a lower alcohol.

19. The process of claim 17 wherein the liquid diluting agent is methanol.

20. The process of claim 1 wherein quantity of catalyst is from about $10^{-7}$ to about $10^{-3}$ gram atom of Group VIII metal per mol of olefinically unsaturated organic compound.

21. The process of claim 1 wherein quantity of catalyst is from about $10^{-6}$ to about $10^{-4}$ gram atom of Group VIII metal per mol of olefinically unsaturated organic compound.

22. The process of claim 1 wherein the molar ratio of the number of moles of olefinically unsaturated organic compound relative to the number of moles of carbon monoxide is from about 10:1 to about 1:5.

23. The process of claim 1 wherein the molar ratio of the number of moles of olefinically unsaturated organic compound relative to the number of moles of carbon monoxide is from about 5:1 to about 1:2.

24. The process of claim 1 wherein contacting temperature is from about 20° to about 200° C. and pressure is from about 1 to about 200 bar.

25. The process of claim 1 wherein contacting temperature is from about 30° to about 150° C. and contacting pressure is from about 20 to about 100 bar.

26. The process of claim 1 wherein olefinically unsaturated organic compound is hydrocarbon.

27. The process of claim 1 wherein olefinically unsaturated organic compound is ethylene.

28. The process of claim 1 wherein olefinically unsaturated organic compound is comprised of ethylene and at least one other olefinically unsaturated hydrocarbon.

29. The process of claim 1 wherein olefinically unsaturated organic compound is comprised of ethylene and propylene.

30. The process of claim 1 wherein the quinone is a 1,4-quinone.

31. The process of claim 1 wherein the quinone is a substituted or unsubstituted benzoquinone.

32. The process of claim 31 wherein the benzoquinone is 1,4-benzoquinone.

33. The process of claim 1 wherein in the reaction to obtain the catalyst, quantity of quinone is from about 1 to about 10000 mol per gram atom of Group VIII metal.

34. The process of claim 1 wherein in the reaction to obtain the catalyst, quantity of quinone is from about 10 to about 5000 mol per gram atom of Group VIII metal.

35. The process of claim 2 wherein the palladium compound is a salt of a carboxylic acid.

36. The process of claim 35 wherein the non-hydrohalogenic acid having a pKa less than 6 is an acid selected from the group consisting of sulfonic acids having a pKa of less than 2 and carboxylic acids having a pKa of less than 2.

37. The process of claim 36 wherein M is phosphorus.

38. The process of claim 37 wherein the bivalent organic bridging group R contains three carbon atoms.

39. The process of claim 38 wherein the hydrocarbon groups $R^1$, $R^2$, $R^3$, and $R^4$ each contain an aryl group bonded directly to M.

40. The process of claim 39 wherein to bidentate ligand is selected from the group consisting of 1,3-bis(-diphenylphosphine)propane, and 2-methyl-2-(methyldiphenylphosphine)-1,3-bis(diphenylphosphine)propane.

41. The process of claim 39 wherein olefinically unsaturated organic compound is α-olefin.

42. The process of claim 41 wherein α-olefin is ethylene and at least one other α-olefin.

43. The process of claim 41 wherein E-olefin is ethylene and propylene.

44. The process of claim 41 wherein α-olefin is ethylene.

* * * * *